United States Patent [19]

Pastor et al.

[11] Patent Number: 4,775,497

[45] Date of Patent: * Oct. 4, 1988

[54] ESTERIFICATION PROCESS WITH CALCIUM HYDROXYARYL PHOSPHONATE-ORGANOSILICON HETEROCYCLE CATALYST SYSTEM

[75] Inventors: Stephen D. Pastor, Yonkers, N.Y.; Richard W. Thomas, Nutley, N.J.

[73] Assignee: Ciba-Geigy Corporation, Ardsley, N.Y.

[*] Notice: The portion of the term of this patent subsequent to Apr. 21, 2004 has been disclaimed.

[21] Appl. No.: 922,919

[22] Filed: Oct. 24, 1986

[51] Int. Cl.$^4$ .................. C09F 1/04; C09F 5/08; C08G 63/04; C08G 63/38

[52] U.S. Cl. ................... 260/103; 260/104; 556/428; 560/99; 560/231; 560/103; 560/104; 528/275; 528/286; 527/604; 527/311

[58] Field of Search ............... 556/428; 260/103, 104; 560/99, 231, 103, 104; 528/275, 286; 527/604, 311

[56] References Cited

U.S. PATENT DOCUMENTS

| | | | |
|---|---|---|---|
| 3,036,043 | 5/1962 | Gruschke et al. | 528/275 |
| 3,053,809 | 9/1962 | Linville | 528/275 |
| 3,546,179 | 12/1970 | Koller | 528/275 |
| 3,842,111 | 10/1974 | Meyer-Simon et al. | 556/428 |
| 4,008,207 | 2/1977 | Omoto et al. | 528/286 |
| 4,116,942 | 9/1978 | Weinberg et al. | 528/286 |
| 4,503,243 | 3/1985 | Spivack et al. | 556/428 |
| 4,582,870 | 4/1986 | Spivack et al. | 524/262 |
| 4,659,514 | 4/1987 | Beuke | 260/104 |

FOREIGN PATENT DOCUMENTS 042297 7/1964 Japan.

*Primary Examiner*—Harold D. Anderson
*Assistant Examiner*—Dennis R. Daley
*Attorney, Agent, or Firm*—Harry Falber

[57] ABSTRACT

An esterification process particularly for the preparation of rosin esters, polyesters and polymeric esters wherein aliphatic or aromatic carboxylic acids are reacted with appropriate alcohols in the presence of catalytic amounts of a mixture of a calcium hydroxyaryl phosphonate and an organosilicon heterocycle, the presence of said mixture serving to reduce the time necessary for complete esterification and to provide esters with increased oxidation stability and better color.

16 Claims, No Drawings

ESTERIFICATION PROCESS WITH CALCIUM HYDROXYARYL PHOSPHONATE-ORGANOSILICON HETEROCYCLE CATALYST SYSTEM

It is known that esterification reactions can be conducted in the presence of a variety of esterification catalysts. However, numerous difficulties are encountered in rosin ester, polyester and polymeric ester esterifications utilizing the state of the art catalysts. These difficulties can be grouped into unduly prolonged esterification times, poor oxygen stability and color formation. More specifically, the prolonged reaction times required to complete the esterification reaction are uneconomical and, more importantly, may effect decarboxylation of the acid so as to eliminate sites for the esterification reaction resulting in incorrect reactant stoichiometry and incomplete reaction. Impure products result. The oxygen instability of the resulting esters is particularly in evidence during initial storage, there being a propensity to form hydroperoxides and peroxides, and during subsequent use thereby severely limiting the applicability of the esters. Uses as plasticizers in polymers and tackifiers in adhesives are substantially foreclosed by such instability. Likewise, the formation of dark coloration substantially limits the areas of use for the resulting esters.

Frequently used acidic and basic esterification catalysts tend to promote the difficulties noted hereinabove. While various metal salts such as calcium formate, calcium stearate and calcium acetate provide satisfactory catalytic activity, they do not provide antioxidant or color inhibition effects. Accordingly, it is essential to post-add antioxidants and other stabilizers in order to obtain long-term stability. U.S. application Ser. No. 822,437 provides an improved system in disclosing the use of calcium hydroxybenzyl phosphonate as a catalyst in such esterification reactions. Although significant improvements in catalytic activity and stabilization are noted, further color improvement and long term stabilization characteristics are still desired.

Reference is also made to U.S. Pat. No. 4,172,070 wherein rosin esters are prepared in the presence of arylsulfonic acid catalysts. Although improved esterification and stability is indicated, longer reaction times than desired are still required, poor color often results and some decarboxylation occurs. The decarboxylation is a more serious problem when the acid is added to the initial reaction mix or during early stages of the esterification reaction. Such decarboxylation results in the formation of low molecular weight materials which must necessarily be removed in order to obtain esters of appropriate physical properties such as softening points. It is also required to wash the sulfonic acid out of the polyester in order to obtain purer products and to consider the possibility of some post-addition of antioxidants in view of the continuing proclivity to form hydroperoxides or peroxides during processing and storage.

It is, therefore, the primary object of this invention to provide an esterification catalyst system which provides rapid esterification reaction times so as to substantially eliminate the problems associated with prolonged reactions and which facilitates obtaining pure, completely esterified products exhibiting reduced color formation and subsequent oxygen and storage stability during use.

Other objects and advantages of this invention will become apparent from the following description thereof.

It has now been surprisingly discovered that by utilizing a combination of a calcium hydroxyaryl phosphonate and a organosilicon heterocycle as an esterification catalyst for rosin esters, esters of significantly improved performance characteristics are obtained. Thus, the reaction conditions minimize decarboxylation and result in much purer products. The need for special removal steps is substantially eliminated. Esters of desired softening points are prepared. Similar advantages are obtained in the preparation of other polyesters. The mixed catalyst system also provides esters having excellent antioxidant properties. Correspondingly, post-esterification addition of stabilizers is not required. The absence of formation of hydroperoxide and peroxide groups during storage and the long term stability of the polyesters and polyester-containing formulations are evidence of such characteristics. Color formation in the polyesters and formulated products is likewise substantially reduced. Thus, oxygen-stable esters of good color and good purity are prepared. It is particularly in the area of reduced color and prolonged oxidation stability that the instant systems are a significant improvement over the prior art and over the performance of the individual components of the catalyst system.

The process of this invention involves reacting aliphatic or aromatic carboxylic acids with appropriate alcohols at temperatures ranging from about 150° to 300° C. Typical aliphatic acids include $C_1-C_{18}$ monocarboxylic acids such as butyric, caproic, lauric, myristic, palmitic, stearic, oleic, linoleic and linolinic acids; $C_2-C_{18}$ dicarboxylic acids such as succinic, glutaric, adipic, azelaic, sebacic and maleic acids; tricarboxylic acids such as citric acid; and rosin acids (abietic and pimaric acid types). Aromatic mono-, di- and tri-carboxylic acids include benzoic acid, phthalic acid, isophthalic acid, terephthalic acid, methoxy benzoic acid, naphthoic acid, cinnamic acid and trimellitic acid; as well as aralkyl and alkaryl carboxylic acids and anhydrides such as phthalic and trimellitic anhydrides. The rosin acids are preferred for use in this invention.

Typical alcohols include $C_1-C_{18}$ monohydric alcohols such as ethanol, butanol, octanol, dodecanol and stearyl alcohol; $C_2-C_{18}$ diols such as ethylene glycol, propanediol, butanediol, butylene diol and hexanediol; polyhydric alcohols such as glycerol, pentaerythritol, dipentaerythritol, tripentaerythritol, trimethylolethane and trimethylolpropane; and naturally occuring sugars such as dextrose and sucrose. The polyhydric alcohols are preferred. Stoichiometric amounts of acid and alcohol are utilized, with the possibility of utilizing up to about a 30% equivalent excess of alcohol if a polyhydric alcohol is used, with a 5-30% excess particularly applicable. As noted, the invention is particularly appropriate for preparing di-, tri- or tetra-esters as well as polymeric esters such as polyethylene terephthalate.

Applicable calcium 4-hydroxyarylphosphonates correspond to the formula

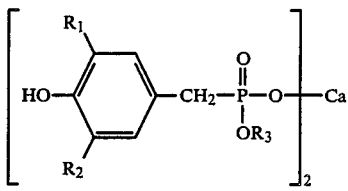

wherein $R_1$, $R_2$ and $R_3$ independently are $C_1$–$C_{18}$ alkyl, phenyl, $C_7$–$C_9$ aralkyl or $C_7$–$C_9$ aralkyl substituted by $C_1$–$C_8$ alkyl. Such calcium phosphonates fall within the disclosure of U.S. Pat. No. 3,310,575. Preparative procedures and areas of use are noted in said patent. The calcium bis[monoethyl(3,5-di-tert.butyl-4-hydroxybenzyl)phosphonate] is preferred and is commercially available from CIBA-GEIGY Corporation as IRGANOX 1425.

Certain of the applicable organosilicon heterocycles fall within the disclosures of U.S. Pat. No. 4,503,243 and U.S. Pat. No. 4,582,870. Preparative procedures and areas of use are noted in said patents. Other organosilicon heterocycles are novel compounds, i.e. the nine membered ring systems. Thus, the silicons correspond to the formula

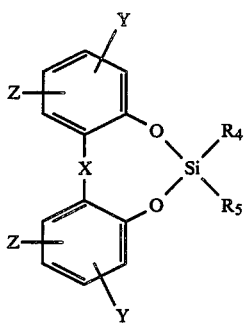

wherein

Y, Z, $R_4$ and $R_5$ independently are hydrogen, $C_1$–$C_{18}$ alkyl, phenyl, $C_7$–$C_9$ aralkyl or $C_7$–$C_9$ aralkyl substituted by $C_1$–$C_8$ alkyl; and X is —S— or —S—S—.

Preferred compounds within the above structure are those wherein Y is in the ortho position to the silane oxygen in each of the phenyl rings. Also especially preferred is for the Z group to be in the para position to oxygen, particularly if Z is tert-alkyl.

The Y and Z groups are preferably straight-chain or branched alkyl with 1 to 8 carbon atoms, such as methyl, butyl, sec-butyl, tert-butyl, tert-penyl, 2-ethylhexyl, n-octyl and tert-octyl. The groups tert-butyl, tert-pentyl and tert-octyl are especially preferred.

The $R_4$ and $R_5$ groups are preferably hydrogen, $C_1$–$C_4$ alkyl or phenyl with $R_4$ and $R_5$ as methyl or $R_4$ as methyl and $R_5$ as hydrogen being especially preferred. Aralkyl substituents include benzyl, α-methylbenzyl and α,α-dimethylbenzyl.

As previously noted, those compounds wherein X is —S—S— are new and thus form part of the instant invention. These compounds can be prepared by the method noted in U.S. Pat. No. 4,503,243, namely, by reacting the appropriately substituted halosilane with a dithiobis(alkylated phenol) or a trithiobis(alkylated phenol) optionally in a solvent to yield the desired product. The solvent is preferably aromatic, such as benzene, toluene, xylene and the like, or a heterocyclic ether such as tetrahydrofuran. The reaction temperature ranges from 0° C. to 100° C. The preferred method for preparing these compounds involves reacting the halosilane, primarily the chloro-silane, with the appropriate phenol in the presence of a proton acceptor such as a tertiary amine, for example, triethylamine or pyridine.

The starting materials needed to prepare these organosilicon heterocyclic compounds are items of commerce or can be prepared by known methods.

The silane starting materials correspond to the formula

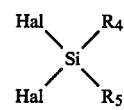

wherein Hal is halogen, preferably chlorine, and $R_4$ and $R_5$ are as previously defined, preferably hydrogen, methyl or phenyl.

The phenolic sulfide starting materials correspond to the formula

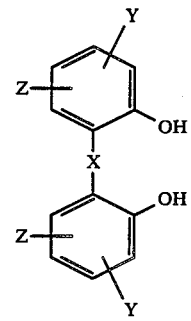

wherein X, Y and Z are as previously defined.

The catalyst system is utilized in concentrations of from about 0.05–10.0%, by combined weight of acid and alcohol, preferably from about 0.15–2.0%, and most preferably about 0.4–1.4%. The individual phosphonate and silane components are present in weight ratios ranging from 10:1 to 1:20, preferably from about 2:1 to 1:8, and most preferably 1:1.

The catalyst system may be added prior to the initiation of the esterification reaction or at a designated point during the reaction when the original acid number has been reduced by about 10 to 67%. Completion of the reaction is determined by monitoring of the acid number, esters of acid number below about 20 generally being desired. The process of the invention will generally not exceed seven hours in order to prepare the desired esters. The resulting esters show excellent color and extended oxidation stability during storage and as part of formulated products. Rosin-based esters prepared according to the invention are of particular value when used as tackifiers in various adhesive formulations such as ethylene/vinyl acetate hot melt adhesives.

The following examples will further illustrate the embodiments of the instant invention. In these examples, all parts and percentages are by weight unless otherwise noted.

Examples 1-2 illustrate the preparation of various organosilicon heterocycles falling within the indicated structural formula. These preparations supplement the disclosure in U.S. Pat. No. 4,503,243.

EXAMPLE 1

2,4,8,10-Tetra-tert-butyl-6,6-diphenyl-dibenzo[d,g][1,3,6,2]dioxathiasilocin A solution of 12.66 grams of dichlorodiphenylsilane in 50 ml of toluene at 5°–10° C. is added dropwise to a solution of 22.14 grams of 2,2′-thiobis(4,6-di-tert-butylphenol) and 10.12 grams of triethylamine in 100 ml of toluene. The reaction mixture is heated at 92° C. until the reaction is complete as evidenced by the disappearance of the phenolic absorption in the IR spectrum. The triethylamine hydrochloride is removed by filtration and the solvent is removed in vacuo. The residue is recrystallized from 2-butanone to give 13.49 grams (43%) of a white solid: mp 202°–205° C.

Anal. Calcd. for $C_{40}H_{50}O_2SSi$: C, 77.1; 8.1. Found: C, 76.9; H, 8.2.

EXAMPLE 2

2,4,8,10-Tetra-tert-butyl-6,6-dimethyl-dibenzo[d,h][1,3,6,7,2]dioxadithiasilonin Method A: From dithiobisphenol.

The method of Example 1 is repeated using 1.87 grams of dichlorodimethylsilane, 7.12 grams of 2,2′-dithiobis(4,6-di-tert-butylphenol), and 3.04 grams of triethylamine in a total of 75 ml of toluene. The reaction mixture is heated at 50°–55° C. until the reaction is complete. The residue is recrystallized from 2-butanone to give 3.66 grams (46%) of a light yellow solid: mp 214°–215° C.

Anal. Calcd. for $C_{30}H_{46}O_2S_2Si$: C, 67.9; H, 8.7; S, 12.1. Found: C, 67.5; H, 8.9; S, 11.8.

Method B: From trithiobisphenol.

The method of Example 1 is repeated using 1.87 grams of dichlorodimethylsilane, 7.33 grams of trithiobis(4,6-ditert-butylphenol) and 3.04 grams of triethylamine in a total of 75 ml of toluene. The reaction mixture is heated at 75° C. until the reaction is completed. The residue is recrystallized from 2-butanone to give 0.80 grams (10%) of product identical to that prepared by Method A: Mass Spectrum m/z 530.

EXAMPLE 3

Rosin Esterification

A 1 liter flask equipped with a Dean-Stark trap and a nitrogen atmosphere is charged with 500 grams of tall oil rosin of acid number 179 and a mixture of pentaerythritol (30% stoichiometric excess), 2.5 grams of the calcium bis[monoethyl-3,5-di-tert.butyl-4-hydroxybenzyl)-phosphonate], 2.5 grams of the indicated silane and 25 grams of xylene and heated rapidly to 275° C. The extent of esterification is determined by monitoring the acid number. When an acid number of near 15 mg KOH/g is reached, the reaction mixture is cooled to 95° C. and the volatiles are removed under a stream of nitrogen (short-path distillation head) at that temperature until a softening point (determined by the ring and ball method-ASTM E 28-67) of near 95° C. is obtained. The following data reflects the reaction conditions and the characteristics of the resulting ester.

| Es- ter | Additives | Conc. (% by wt.) | Reaction Time (hrs) | Acid # | Softening Point (°C.) | Gardner Color |
|---|---|---|---|---|---|---|
| A | — | — | 8 | 35 | — | 13 |
| B | phosphonate | 0.5 | 7.2 | 16 | 97 | 11 |
| C | phosphonate | 1.0 | 6.75 | 11 | 102 | 10–11 |
| D | phosphonate + silane of Ex. 1 | 0.5 0.8 | * | * | * | 5–6 |
| E | phosphonate + silane of Ex. 2 | 0.5 0.5 | 7.25 | 15 | 92 | 5–6 |

*Reaction conducted until bleaching effect observed.

These data thus indicate both the excellent color and oxidative stability of the system of this invention.

EXAMPLE 4

This example illustrates the oxidative stability of the instant systems in end use applications. Thus, the various esters, either unaged or after having been aged at 50° C. for 5 and 10 days respectively, are incorporated into the following hot melt adhesive:

|  | parts |
|---|---|
| ethylene/vinyl acetate (ELVAX 250) | 1 |
| microcrystalline wax | 1 |
| rosin ester | 1 |

The resulting adhesives are prepared in an open beaker maintained at 177° C. Samples are analyzed to determine Gardner Color and viscosity (determined on a Brookfield Thermosel System using a #21 spindle at 10 rpm at 177° C.). The following results are obtained.

| | Initial Properties (days of ester aging) | | | | | |
|---|---|---|---|---|---|---|
| | Gardner Color | | | Viscosity (cps) | | |
| Ester | 0 | 5 | 10 | 0 | 5 | 10 |
| B | 6 | 10 | 11 | 2825 | 2850 | 3650 |
| C | 5 | 7 | 8 | 3000 | 3175 | 3400 |
| E | 4 | 4 | 6 | 2850 | 2750 | 2775 |

These data thus illustrate the improvement in color and viscosity stability of adhesive formulations containing a rosin ester prepared according to the invention. Furthermore, the preparation of ethylene/vinyl acetate hot melt adhesives using aged rosin esters generally results in adhesives with higher color and viscosity than those prepared with unaged rosin esters. In contrast, adhesives prepared from rosin esters of this invention exhibit the desired pattern of no significant change in initial properties when using aged rosin esters.

Summarizing, it is seen that this invention provides an improved esterification process. Variations may be made in proportions, procedures and materials without departing from the scope of the invention as defined by the following claims.

What is claimed is:

1. In an esterification procedure wherein an aliphatic or aromatic carboxylic acid or anhydride is reacted with an equivalent amount or a maximum 30% excess of an alcohol at elevated temperatures in the presence of a catalyst, the improvement comprising conducting said reaction in the presence of from about 0.05–10.0%, by weight, of a blend of (a) a calcium 4-hydroxy-aryl phosphonate corresponding to the formula

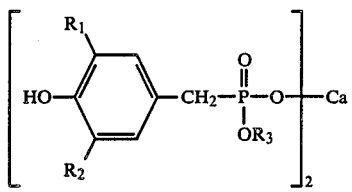

wherein $R_1$, $R_2$ and $R_3$ independently are $C_1$–$C_{18}$ alkyl, phenyl, $C_7$–$C_9$ aralkyl or $C_7$–$C_9$ aralkyl substituted by $C_1$–$C_8$ alkyl; and (b) an organosilicon heterocycle corresponding to the formula

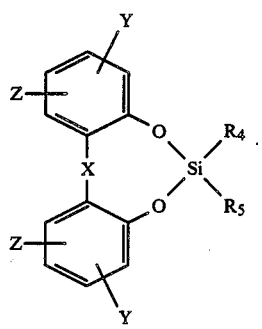

wherein

Y, Z, $R_4$ and $R_5$ independently are hydrogen, $C_1$–$C_{18}$ alkyl, phenyl, $C_7$–$C_9$ aralkyl or $C_7$–$C_9$ aralkyl substituted by $C_1$–$C_8$ alkyl; and X is —S— or —S—S—; as said catalyst.

2. The process of claim 1, wherein said acid is an aliphatic $C_1$–$C_{18}$ monocarboxylic acid, aliphatic $C_2$–$C_{18}$ dicarboxylic acid, aliphatic tricarboxylic acid, aromatic mono-, di- or tri-carboxylic acid or rosin acid.

3. The process of claim 2, wherein said acid is a rosin acid.

4. The process of claim 1, wherein said alcohol is a $C_1$–$C_{18}$ monohydric alcohol, $C_2$–$C_{18}$ diol, polyhydric alcohol or naturally occurring sugar.

5. The process of claim 4, wherein said alcohol is pentaerythritol or dipentaerythritol.

6. The process of claim 1, wherein said blend is added to the acid and alcohol reactants prior to the initiation of the esterification reaction.

7. The process of claim 1, wherein said phosphonate and said organosilicon heterocycle are present in a weight ratio ranging from 10:1 to 1:20.

8. The process of claim 7, wherein said weight ratio range from 2:1 to 1:8.

9. The process of claim 1, wherein said phosphonate is calcium bis[monoethyl-(3,5-di-tert.butyl-4-hydroxybenzyl)phosphonate].

10. The process of claim 1, wherein Y is in the ortho position and Z is in the para position to the silane oxygen in each phenyl ring.

11. The process of claim 1, wherein Y and Z are straight-chain or branched $C_1$–$C_8$ alkyl and $R_4$ and $R_5$ are hydrogen, $C_1$–$C_4$ alkyl or phenyl.

12. The process of claim 1, wherein said phosphonate is calcium bis[monoethyl-(3,5-di-tert.butyl-4-hydroxybenzyl)phosphonate] and said organosilicon heterocycle is 2,4,8,10-tetra-tert-butyl-6,6-diphenyl-dibenzo[d,g]-[1,3,6,2]dioxathiasilonin.

13. The process of claim 1, wherein said phosphonate is calcium bis[monoethyl-(3,5-di-tert.butyl-4-hydroxybenzyl)phosphonate] and said organosilicon heterocycle is 2,4,8,10-tetra-tert-butyl-6,6-dimethyl-dibenzo[d,h]-[1,3,6,7,2]dioxadithiasilonin.

14. The process of claim 1, wherein a rosin acid is reacted with a 5–30% excess equivalent amount of pentaerythritol in the presence of 0.15–2.0%, by weight, of said blend.

15. The ester resulting from the process of claim 1.

16. The ester resulting from the process of claim 13.

* * * * *